United States Patent [19]
Nickerson

[11] Patent Number: 5,633,538
[45] Date of Patent: May 27, 1997

[54] ACTIVE AND ILLUMINATED INFORMATION MODULE FOR MOTOR VEHICLE CIGAR/CIGARETTE LIGHTER OR OTHER POWER RECEPTACLES

[76] Inventor: Gene A. Nickerson, 8523 N. 50th Pl., Paradise Valley, Ariz. 85253-2006

[21] Appl. No.: 957,155

[22] Filed: Oct. 7, 1992

[51] Int. Cl.⁶ ........................................ B60L 1/00
[52] U.S. Cl. .............................. 307/10.8; 362/61
[58] Field of Search ...................... 307/10.1, 10.8; 362/61, 85

[56] References Cited

U.S. PATENT DOCUMENTS

| | | | |
|---|---|---|---|
| 2,684,476 | 7/1954 | Trempe | 362/83.3 |
| 4,922,223 | 5/1990 | Prevot | 362/226 |
| 4,926,573 | 5/1990 | Hetrick | 40/663 |
| 5,005,306 | 4/1991 | Kinstler | 362/80 |
| 5,190,307 | 3/1993 | Brown et al. | 280/281 |

*Primary Examiner*—Jeffrey A. Gaffin
*Attorney, Agent, or Firm*—Tod R. Nissle, P.C.

[57] ABSTRACT

An attachment for a cigarette lighter receptacle in a vehicle simulates the external shape, size, and appearance of a conventional vehicle cigarette light which is normally seated in the cigarette lighter receptacle. A control circuit, light source, smoke detector, and alarm are housed in the attachment. The attachment includes electrical contacts which are connected to the control circuit and which also, when the attachment is seated in the cigarette lighter receptacle, interconnect the control circuit with both the ground and electrical contact of the vehicle cigarette lighter receptacle.

16 Claims, 5 Drawing Sheets

ACTIVE AND ILLUMINATED INFORMATION MODULE FOR MOTOR VEHICLE CIGAR/CIGARETTE LIGHTER OR OTHER POWER RECEPTACLES

BACKGROUND OF THE INVENTION

The invention relates to signals, signs, and other indicia for informing the occupants of a motor vehicle.

Owners of motor vehicles often wish to display a message to the occupants of the motor vehicle. This can be done verbally by the owner. However, there are times when the vehicle owner wishes to convey the message in a visual form, or audio form but not by his voice. As an example, an owner may wish to convey the idea that "no smoking" is permitted in his vehicle or that the occupants are to "buckle up". There are many ideas which the owner may wish to convey to the occupants of his vehicle.

Owners of a vehicle who are not the drivers or the occupant may wish to convey a message to the occupants of a motor vehicle. As an example, car rental agencies may wish to convey a message "Thank you for driving our vehicle", or "This is a No-Smoking Vehicle", or "Return Vehicle to Airport Only", or "Use Leaded Fuel Only", or other pertinent information.

Also, non-owner individuals may wish to inform the occupants of a motor vehicle of an event which has occurred or will occur, such as "Happy Birthday, Dad!". Or they may wish to display the symbol of "Super Mouse", or the words "Visited Fantastic Studios", or "I'm Proud to be an American", or other pertinent information.

Many different messages may be conveyed to motor vehicle occupants in an automatic manner by use of this invention.

The preferred embodiment of this invention is that of conveying to the occupants of the motor vehicle that "No Smoking" is allowed in the vehicle.

Many non-smokers intensely dislike the smell of fumes and the inhalation of secondary smoke produced by persons when cigarettes, cigars, pipes, or other smoking materials are used. Some non-smokers are severely allergic to such smoke and object for health reasons to being in the presence of others who smoke. Also, the owner of a motor vehicle may not wish the motor vehicle to take on the odor from smoking materials. The smoke from cigarettes, or other smoking materials, rapidly permeate the interior of a motor vehicle, especially when modern air conditioning systems reuse the; same smoke laden air within the motor vehicle.

Also, the ride in a motor vehicle frequently presents an opportunity for relaxation and conversation and under these conditions the objecting non-smokers may feel tempted to suppress their objections to others smoking. This invention overcomes the problem of suppressed objections by automatically presenting the "No Smoking" message.

Thus, many non-smokers would welcome the availability of a device for use in a motor vehicle to provide an automatic, unmistakable indication to passengers that the smoking of cigarettes, cigars, pipes, or other smoking material is strongly undesired or forbidden in that vehicle.

This invention not only informs the passengers of the motor vehicle to "not smoke", but the invention also is designed in such a way as to replace the cigar/cigarette lighter provided in a motor vehicle which is often used by a passenger to initiate the smoking process.

Thus in the preferred embodiment, a warning to the occupants of a motor vehicle is given at the very physical location where an individual would attempt to initiate the smoking process.

SUMMARY OF THE INVENTION

An object of this invention is to provide a device which can be plugged into a motor vehicle and which device automatically and visually conveys a message to the occupants of a motor vehicle. The preferred embodiment is to convey that smoking is not permitted in the motor vehicle containing the device.

Briefly described, and in accordance with one embodiment thereof, the invention provides an Information Module to be inserted into a motor vehicle cigar/cigarette lighter or other such receptacles located in a motor vehicle; a first electrical contact conductor located on the end of the module for electrically contacting the motor vehicle battery power contact located at the bottom of the receptacle when the module is inserted into the receptacle; a second electrical contact conductor located on the side wall of the module for electrically contacting an electrical ground conductor of the receptacle; a control circuit in the module connected by the first and second terminals to the first and second electrical contact conductors of the motor vehicle; a light emitting device inside the module connected to output conductors of the control circuit; and an illuminated information indicator disposed on a front lens supported in fixed relation to the Information Module and illuminated by the light emitting device. In the described embodiment, when the motor vehicle is started, the control circuit is responsive to the motor vehicle battery voltage between the first and second electrical contact conductors in which the receptacle is located, whereby the control circuit then provides electrical power to cause a light emitting device to flash a specified number of times and then cause the light emitting device to remain on whereby to illuminate a message which is visible to the motor vehicle occupants. Alternate embodiments include the illuminator not flashing but being illuminated for a determined amount of time then going dark; the illuminator flashing a determined period of time then going dark. Another embodiment sounds an alarm or an audible message when the illuminator is first lighted. In another embodiment a smoke detector in the module detects the presence of ambient smoke and causes a "no smoking" light to be actuated in the flashing mode and has a voice synthesizer in the module which annunciates an audible "no smoking" message.

The above described invention provides a clear, unmistakable message to the occupants of a motor vehicle in an automated manner, and in the preferred embodiment that no one is permitted to smoke in the motor vehicle. The message is not easily ignored by a passenger in the vehicle, due to the blinking and prominent location of the module in the cigar/cigarette fighter receptacle when such receptacles are not hidden by the motor vehicle manufacturer. The message is not overly obtrusive or impolite. If, in the case of the preferred embodiment, a smoking violation occurs, the audible embodiment of the invention clearly reminds the would-be smoker of his obligation to not smoke.

3

Figure 1:
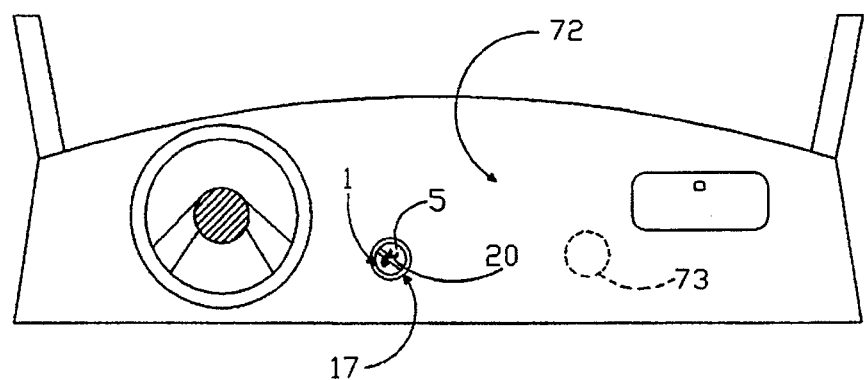
FIG. 1 is a diagram illustrating the Information Module in a motor vehicle cigar/cigarette lighter receptacle with the preferred embodiment "No Smoking" symbol displayed.
Figure 4:
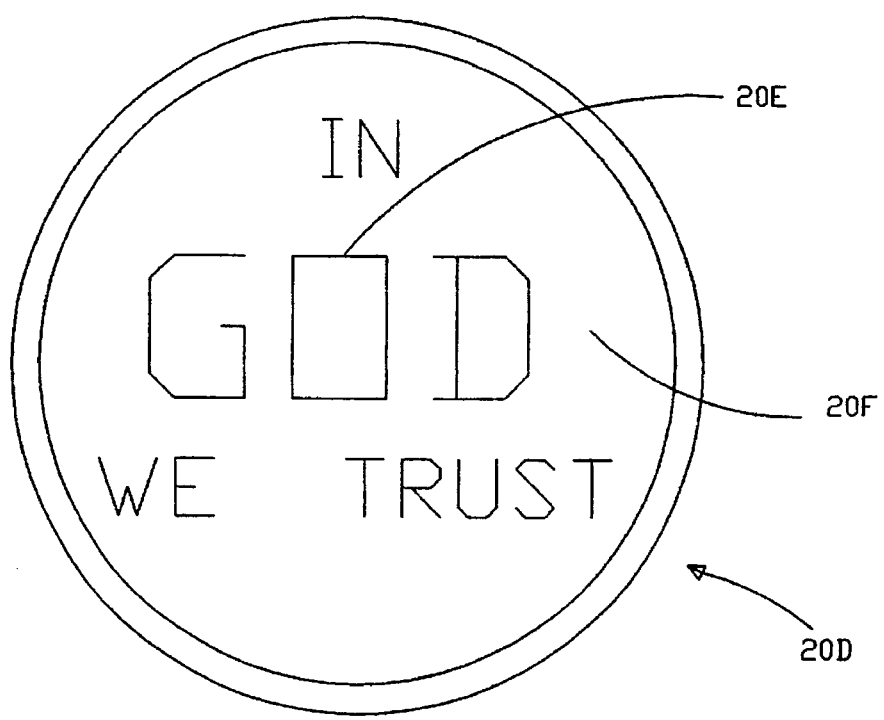

FIG. 4 illustrates an alternate indicia which can be formed on the lens on the front of the module of FIG. 1.

Figure 5:
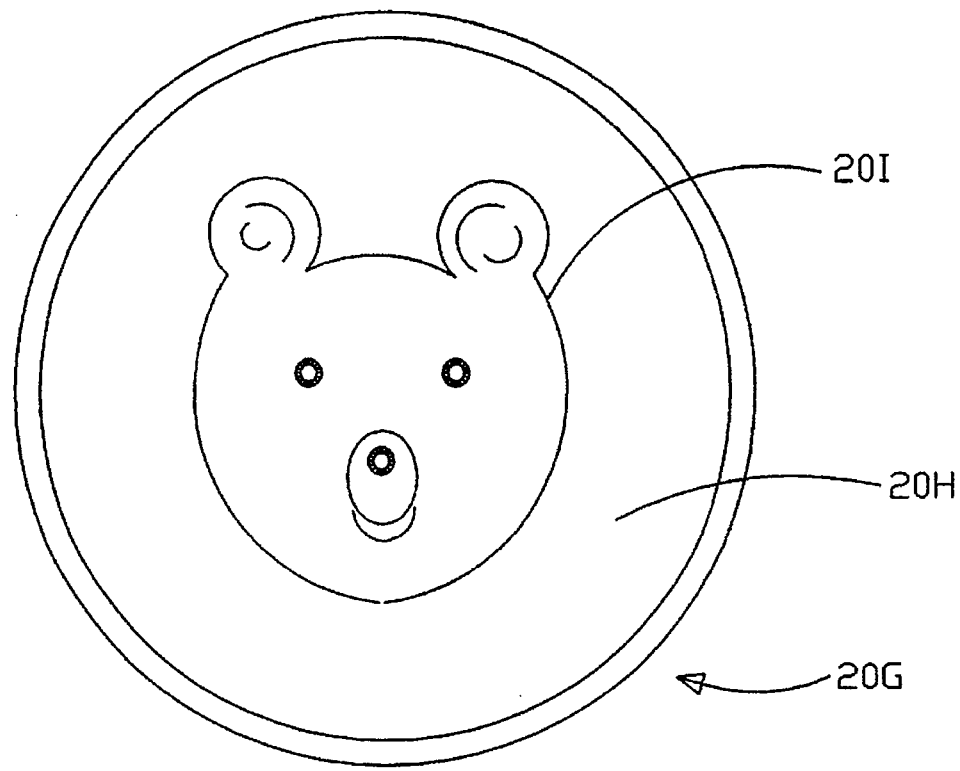

FIG. 5 illustrates still another alternate indicia which can be formed on the lens on the front of the module of FIG. 1.

Figure 6:
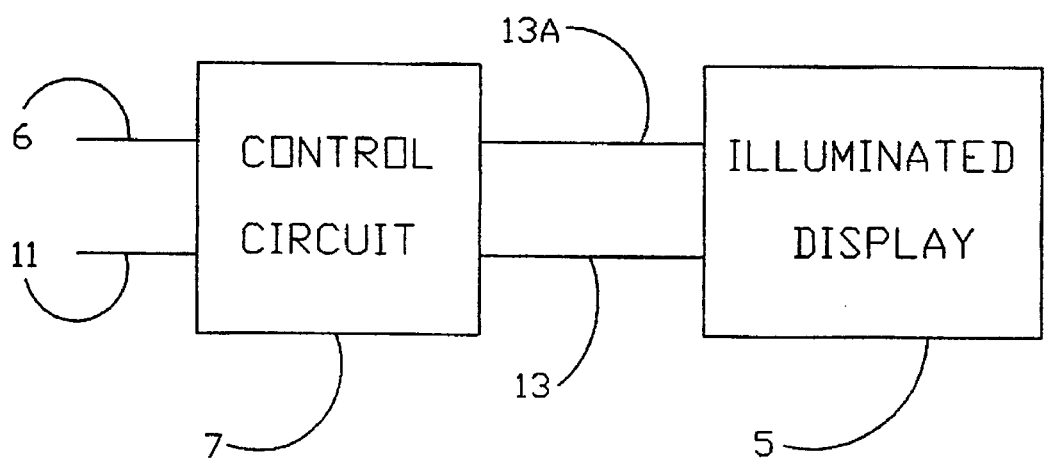

FIG. 6 is a block diagram showing the control circuit which is used to light the illuminated display.

Figure 7:
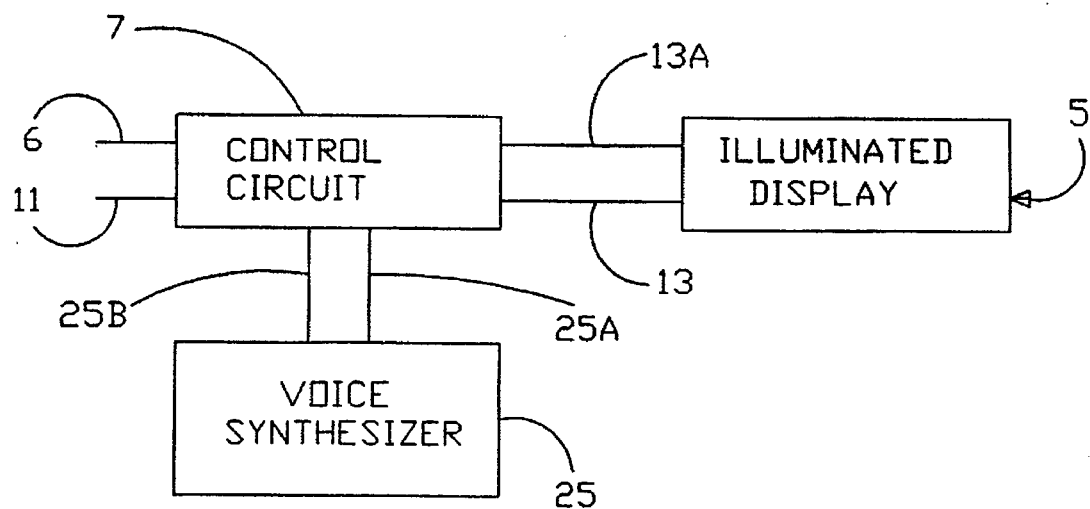

FIG. 7 is a block diagram showing the control circuit, the illuminated display, and the additional voice synthesizer which is activated by the control circuit.

Figure 8:
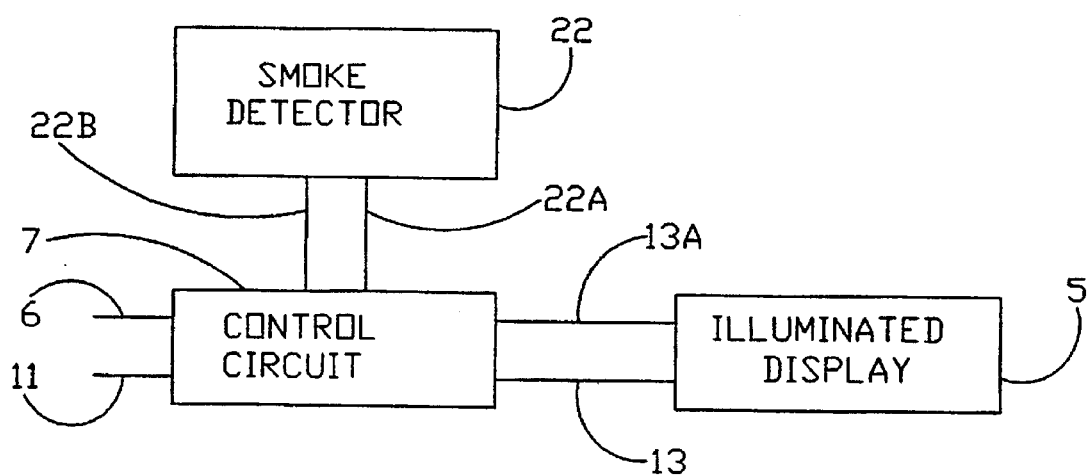

FIG. 8 is a block diagram which shows the control circuit, the illuminated display, and the smoke detector (preferred embodiment) which is used to activate the control circuit.

Figure 2:
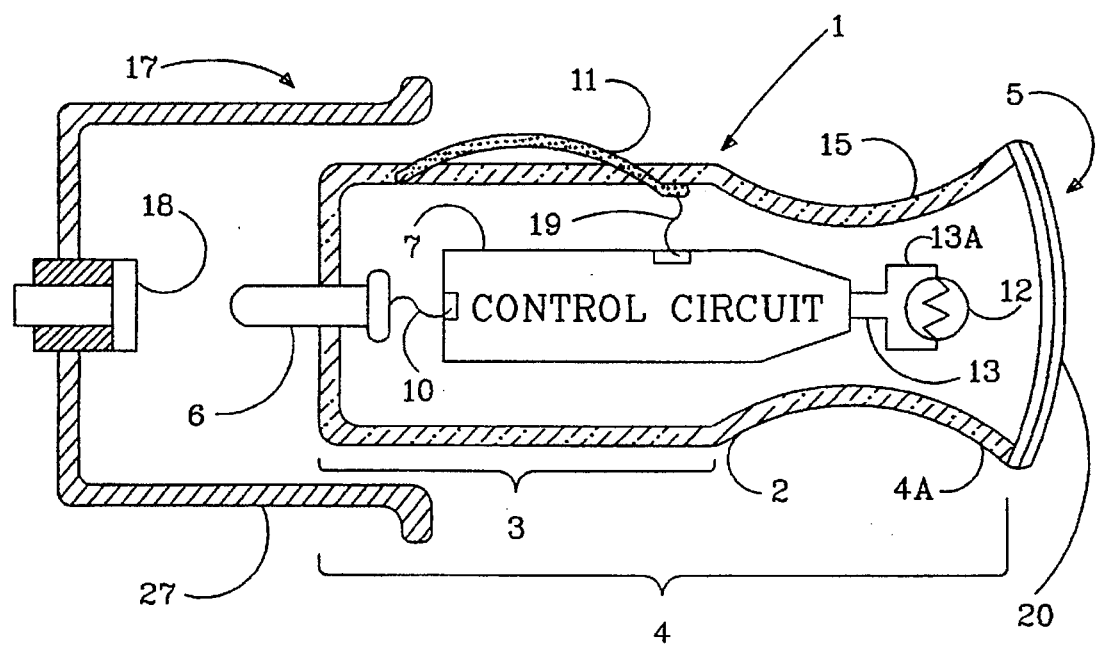
FIG. 2 is a cross-sectional diagram of the plug-in Information Module of the invention.
Figure 9:
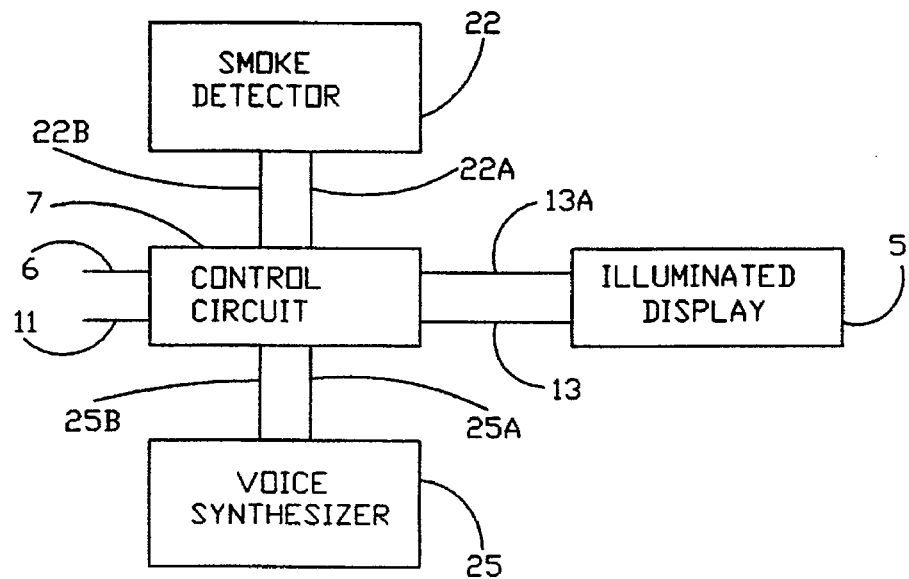
Figure 10:
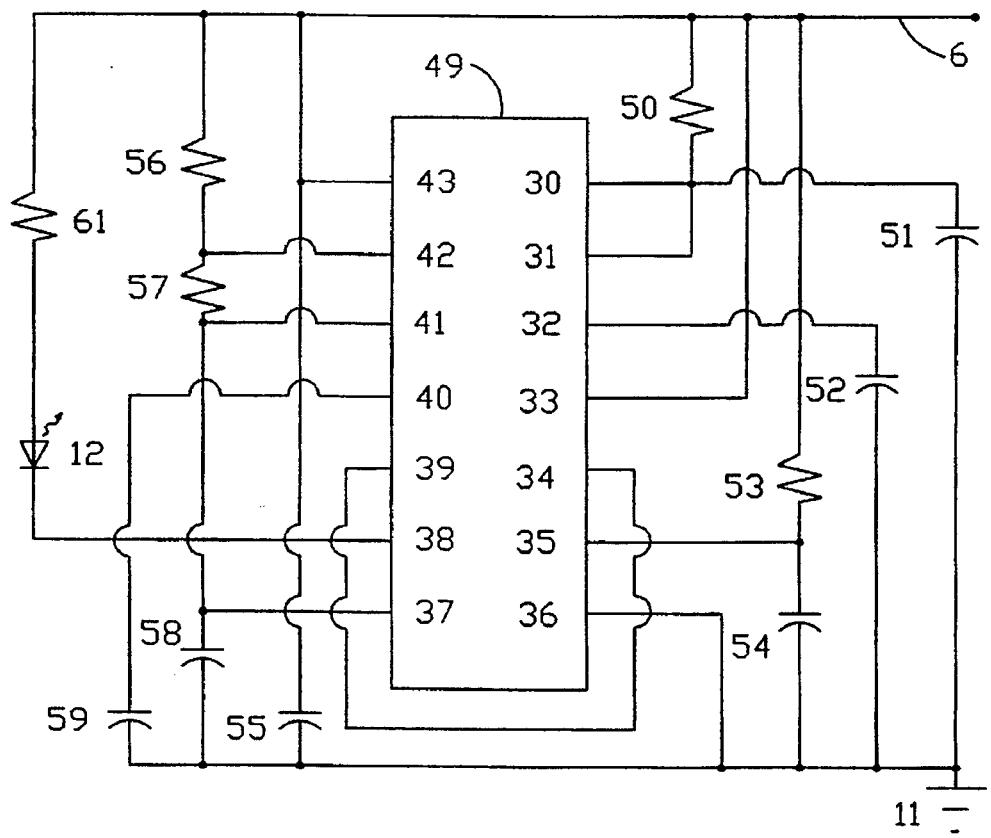

FIG. 9 is a block diagram which shows the control circuit, the illuminated display, the voice synthesizer driven by the control circuit, and the smoke detector which activates the control circuit FIG. 10 is a schematic diagram of the control circuit depicted in the module of FIG. 2.

DETAILED DESCRIPTION OF THE PREFERRED EMBODIMENT

Referring to FIG. 1, the Information Module 1 is inserted into the automobile's cigar/cigarette receptacle 17 or other power source receptacle located in the automobile dashboard 72. The lens 5 of the Information Module 1 contains the preferred embodiment nomenclature of the "No Smoking" sign 20.

Referring to FIG. 2, the Information Module 1, includes a cylindrical body section 4 which is inserted into a motor vehicle elgar/cigarette lighter receptacle 17. A narrowed or straight necked portion 15, of the Information Module 1, connects the front portion 4A of the Information Module 1 to the body 3, and additionally supports the front lens or display 5 to the cylindrical body section 3. The indicia of display 5 is shown as 20.

An electrical contact 6 extends through an electrically insulated opening in the rear of the cylindrical body section 3 to make electrical contact to conductor 18 of the motor vehicles cigar/cigarette lighter receptacle 17. A single, or plurality of resilient electrical contacts 11 or a solid electrical contact ring encircling the cylindrical body 3 are disposed about the side of the cylindrical body section 3 to contact the electrically conductive inner surface of receptacle 17.

The control circuit 7 is mounted within the cylindrical body section 3. The control circuit is electrically connected to contact 6 through conductor 10. The other electrical contact from the control circuit 7, is conducted through conductor 19 to the resilient or solid electrical contact(s) 11.

Figure 3:
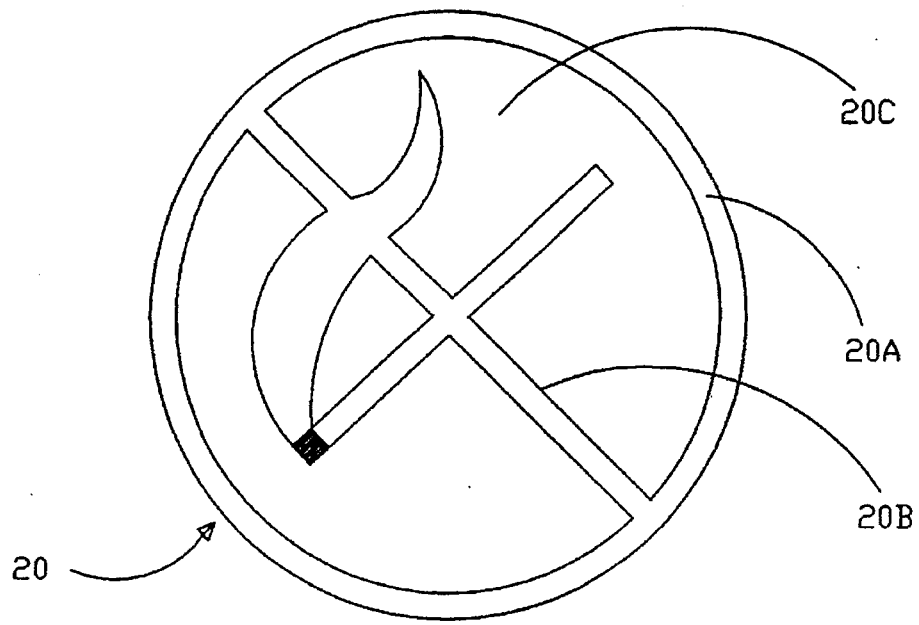
FIG. 3 is a diagram of the preferred embodiment "no smoking" symbol displayed on the front of the module shown in FIG. 1.

The light emitting diode or other illuminating device 12 is supported in the forward portion of neck 15 behind the display lens 5 and forward of the narrowed section 2. Conductors 13 & 13A contact the control circuit 7 to illuminator 12, FIG. 3 shows a standard "no smoking" indicia 20 on lens of FIG. 2. The outer ring 20A and cross band 20B are opaque. The background 20C is transparent. Alternatively, the background 20C is opaque and the cross ring 20B, the circular ring 20A, and the flame and cigarette indicia are transparent.

FIG. 4 shows an alternate indicia 20 displaying the words "In God We Trust" 20E. The words "In God We Trust" are opaque, with the background 20F transparent. Alternatively, the background 20F is transparent, and the words "In God We Trust", 20E are opaque.

4

FIG. 5 shows a symbolic representation of an alternate indicia 20G. The background 20H is transparent with the symbolic representation 20I being opaque. Alternatively, the background 20H is opaque, and the symbol 20I is transparent.

FIG. 6 is a block diagram showing control circuit 7 electrically contacted through contactors 13 and 13A to illumine display 5. Control circuit 7 receives it's electrical power from the cigar/cigarette lighter through the electrical contacts 6 and 11.

FIG. 7 shows a block diagram of the control circuit 7, the illuminated display 5 and a voice synthesizer 25. The control circuit 7 receives power from the cigar/cigarette lighter through conductors 6 and 11. The control circuit supplies electrical power to illumine display 5 through electrical contact conductors 13 and 13A. The control circuit supplies power to the voice synthesizer 25 through electrical conductors 25A and 25B. The illuminated display 5 shows words and/or indicia which inform the occupants inside the motor vehicle, and the voice synthesizer provides an audible source of information to the occupants of the motor vehicle.

FIG. 8 shows the control circuit 7, the illuminated display 5 and a smoke detector 22. Control circuit 7 receives it's electrical power from the cigar/cigarette lighter through electrical contacts 6 and 11. Control circuit 7 supplies the electrical power to illumine the display 5 through contacts 13 and 13A. The smoke detector 22 sends it's signal to the control circuit 7 through contacts 22A and 22B. The smoke detector signal senses the presence of smoke in the motor vehicle passenger compartment and activates the control circuit 7 which activates the illuminated display 5.

FIG. 9 shows the control circuit 7, the illuminated display 5, voice synthesizer 25 and the smoke detector 22. The control circuit 7 receives it's electrical power through conductors 6 and 11. The smoke detector 22 detects the presence of smoke in the motor vehicle passenger compartment and activates control circuit 7 though electrical contacts 22A and 22B. The control circuit 7 supplies the power to illumine display 5 through electrical contacts 13 and 13A. Control circuit 7 activates the voice synthesizer 25 which gives audible information to the automobile occupants through electrical contacts 25A and 25B.

FIG. 10 is the schematic of the control circuit 7. Control circuit 7 is made up of an IC dual timer 49 with the following pin connections: first discharge 30, first threshold 31, first control 32, first reset 33, first output 34, first trigger 35, ground 35, second trigger 37, second output 38, second reset 39, second control 40, second threshold 41, second discharge 42, Vcc+ (positive electrical contact) 43.

The components of the control circuit 50, 51, 52, 53, 54, 55, 56, 57, 58, 59, and 61 are connected to the dual timer 49 to perform the operations described for this invention.

The Vcc+ connection is 6 and ground is 11.

OPERATION OF INVENTION

The "Active and Illuminated Information Module For Motor Vehicle Cigar/Cigarette Lighter Receptacles" displays information both visually and audibly to the occupants of a motor vehicle. The preferred embodiment is described. Alternate embodiments include other signs and indicia, the use of a voice synthesizer to audibly convey information, and a smoke detector to detect the presence of smoke and thus activate the control circuit when the preferred embodiment, a "no smoking" display, is used. Following the installation of the Information Module, the Information Module conveys the information each time the vehicle is started. When the vehicle is started, circuit 7 is activated.

Referring to FIG. 2, the motor vehicle battery power is supplied by terminals 18 and 27. The control circuit 7 electrically contacts terminals 18 an 17 through contacts 6 and 11. The control circuit 7 then operates the light emitting device 12 through electrical contact 13 and 13A.

Two modes of operation occur. The first mode occurs then the cigar/cigarette lighter receptacle's electrical conductors 18 and the conductive inner surface of receptacle 17 have no battery power when the ignition key of the motor vehicle is "off". The second mode occurs when the cigar/cigarette lighter receptacle's electrical conductor 18 and the conductive inner surface of receptacle 17 continue to have battery power when the ignition key of the motor vehicle is "off".

In both modes of operation, the starting of the motor vehicle causes the vehicle battery voltage being applied to circuit 7, or an altered vehicle battery voltage being applied to circuit 7, to begin the cycle of an integrated circuit timer, (other device circuits of similar timing function may be used) that produces the blinking of the light emitting device 12 one to three times per second for approximately 40 seconds, followed by continuous and steady illumination, or other variations as mentioned, of the light emitting device 12. During the blinking stage, sufficient power is applied to the light emitting device 12 to cause lens 5 with symbol 20 attached thereon to be bright and "eye-catching". The subsequent steady illumination is at a brightness to be clearly visible. (A circuit modification causes the light emitting device 12 to be turned off after the blinking cycle.)

After the approximate 40 second blinking interval has elapsed (the interval may be varied from 1 second to continuously on), circuit 7 of FIG. 1 causes the light emitting device to remain continuously illuminated until the motor vehicle is turned off and the light emitting device 12 goes dark in the "first mode". In the second mode, after circuit 7 of FIG. 2 causes the light emitting device 12 to blink approximately 40 times, circuit 7 of FIG. 2 causes the light emitting device to remain continuously illuminated until the vehicle is turned off and then the light emitting device 12 remains on even after the motor vehicle is turned off in the second mode.

Describing the electrical operation of the control circuit:

A negative trigger pulse at pin 35 turns off a transistor in the IC timer that otherwise shorts capacitor 54 to ground. When this pulse occurs, the output at pin 34 goes to the "high" state as capacitor 54 charges through resistor 50. When the charge on capacitor 54 is ⅔ the voltage at Vcc+ 43, the first half of the dual timer discharges capacitor 54 to ground and the output at pin 34 goes "low". Capacitor 52 connects the IC Control, pin 32 to ground to prevent false triggering. Capacitor 51 and resistor 50 set the time delay period for the first half of the timing circuit Resistor 53 and capacitor 54 provide the negative pulse when Vcc+ 43 is activated.

Output 34 becomes the input to pin 39 of the second half of the timer. Capacitor 59 connects the IC Control pin 40 to ground to prevent false triggering. The combination of resistors 56 and 57 along with capacitor 58 respectively connected to pins 42, 41, and 37, set the time period for the second timer, the timer that flashes the light source. Capacitor 55 stabilizes the circuit's operation by accommodating the inductance often present in the wiring system that supplies Vcc+ 43. Light source 12 is powered from pin 38, the output of the IC. Resistor 61 provides the appropriate voltage for the light emitting device.

In operation, when the first timer goes "high" at its output, the second timer flashes the light source until the first timer goes "low" at which time the flashing light emitting device goes to full on in both cases.

FIG. 8 shows an alternate embodiment of the invention, in which the control circuit of FIG. 6 is modified to receive an input 22A and 22B from a smoke detector 22. Whenever smoke is detected in the motor vehicle's passenger compartment, control circuit 22 activates the blinking of the light emitting device 12 shown in FIG. 2. The blinking of the light emitting device may be accompanied by or replaced by an audible indication of a message for the occupants of the motor vehicle. In the preferred embodiment, the words "No Smoking Please" could be the message provided by the voice synthesizer chip in block 25 connected to control circuit 7 by conductors 25A and 25B in FIG. 7. Annunciator or voice synthesizer chips are readily available in the semiconductor industry and can be readily programmed to effectuate enunciation of selected messages. It should be appreciated that the control circuit shown in FIGS. 2, 6, 7, 8, 9 and 10 may be implemented in monolithic form to provide enough room for a suitable smoke detector and voice synthesizer to be incorporated with the timing circuitry within the module shown in FIG. 2.

Referring to the two modes of operation of a motor vehicle, the first mode is the operation of the invention when the motor vehicle has no battery voltage applied to the cigar/cigarette lighter receptacle 17 (FIG. 2) when the motor vehicle is off. In this case, when the vehicle is started, the vehicle battery voltage is applied to contact 18 at the rear of the cigar/cigarette lighter receptacle 17. When the vehicle battery voltage is thus applied via contact 18 and the ground 27 through conductors 6 and 11 to circuit 7, the invention operates. The second mode of operation is when the motor vehicle battery voltage is present at contact 18 at the rear of the cigar/cigarette lighter receptacle 17 when the motor vehicle is off. In this second case, when the vehicle is started, the battery voltage is altered at contact 18 and the ground 27, through conductors 6 and 11 to circuit 7 the invention operates.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed:

1. In a cigarette lighter receptacle in a vehicle, said receptacle being shaped and dimensioned to seat removably a conventional vehicle cigarette lighter and including a ground member, and an electrical contact, the improvement comprising an attachment adapted for manual insertion and removal from said receptacle and including (a) a hollow body having
 (i) a lower portion shaped and dimensioned to be seated in said receptacle, and
 (ii) an upper portion;

(b) a light transmitting lens mounted in said upper portion;

(c) indicia formed on said lens such that said indicia is visible to a passenger in the vehicle when said lower portion is seated in said receptacle;

(d) a light source mounted inside said body, said light source when activated generating light which passes through said lens and outwardly from said body to illuminate said lens and said indicia;

(e) a control circuit mounted inside said body and connected to said light source;

(f) a first contact mounted on said body and, when said lower portion is seated in said receptacle, extending from said ground member to said circuit to electrically interconnect said ground member and said circuit;

(g) a second contact mounted on said body and, when said lower portion is seated in said receptacle, extending from said electrical contact of said receptacle to said circuit to electrically interconnect said electrical contact of said receptacle and said circuit;

said control circuit
including sensor means for monitoring the voltage in said first and second contacts to determine when the motor vehicle is started; and, when said circuit determines that the motor vehicle is started, activating said light source to generate light to illuminate said lens.

2. The attachment of claim 1 including
(a) a smoke detector mounted in said body and connected to said circuit;
(b) an alarm mounted in said body and connected to said circuit;
(c) sensor means in said circuit for monitoring said smoke detector to determine when said smoke detector detects the presence of smoke; and,
(d) means in said circuit for, when said circuit determines that said smoke detector has detected the presence of smoke, activating said alarm means.

3. The attachment of claim 2 wherein said alarm means comprises a blinking light.

4. The attachment of claim 3 wherein said alarm means comprises an audible alarm.

5. The attachment of claim 1 wherein
(a) said cigarette lighter receptacle has a selected width; and,
(b) the greatest width of said attachment is substantially equivalent to said selected width of said cigarette lighter receptacle.

6. The attachment of claim 1 wherein
(a) said cigarette lighter receptacle has a selected inner diameter; and,
(b) said attachment has a generally cylindrical shape; and,
(c) the diameter of said lower portion of said attachment is substantially equivalent to said selected diameter of said cigarette lighter receptacle.

7. The attachment of claim 1 wherein said light source blinks when activated.

8. The attachment of claim 1 wherein the external shape and appearance of said attachment simulates the external shape and appearance of a conventional cylindrically shaped vehicle cigarette lighter.

9. The attachment of claim 1 wherein said indicia indicates smoking is not permitted.

10. In a cigarette lighter receptacle in a vehicle, said receptacle being shaped to seat removably a conventional vehicle cigarette lighter and including
a ground member, and
an electrical contact,
the improvement comprising an attachment adapted for manual insertion and removal from said receptacle and including
(a) a hollow body having
(i) a lower portion shaped and dimensioned to be seated in said receptacle, and
(ii) an upper portion;
(b) a smoke detector mounted in said body;
(c) alarm means mounted in said body;
(d) a control circuit mounted inside said body and connected to said smoke detector and said alarm means;

(e) a first contact mounted on said body and, when said lower portion is seated in said receptacle, extending from said ground member to said circuit to electrically interconnect said ground member and said circuit;

(f) a second contact mounted on said body and, when said lower portion is seated in said receptacle, extending from said electrical contact of said receptacle to said circuit to electrically interconnect said electrical contact of said receptacle and said circuit;

said control circuit
including sensor means for monitoring said smoke detector to determine when said smoke detector detects the presence of smoke; and, when said circuit determines that said smoke detector has detected the presence of smoke, activating said alarm means.

11. The attachment of claim 10 wherein said alarm means comprises a blinking light.

12. The attachment of claim 10 wherein said alarm means comprises an audible alarm.

13. The attachment of claim 10 wherein
(a) said cigarette lighter receptacle has a selected width; and,
(b) the greatest width of said attachment is substantially equivalent to said selected width of said cigarette lighter receptacle.

14. The attachment of claim 10 wherein
(a) said cigarette lighter receptacle has a selected inner diameter;
(b) said attachment has a generally cylindrical configuration and lies within a cylindrical envelope having a selected diameter; and
(c) said selected diameter of said cylindrical envelope is substantially equivalent to said selected inner diameter of said cigarette lighter receptacle.

15. The attachment of claim 10 wherein the external shape and appearance of said attachment simulates the external shape and appearance of a conventional cylindrically shaped vehicle cigarette lighter.

16. In a cylindrical cigarette lighter receptacle in a vehicle, said receptacle including
a ground member, and
an electrical contact,
the improvement comprising an attachment adapted for manual insertion and removal from said receptacle and including
(a) a hollow body having
(i) a lower portion shaped and dimensioned to be seated in said receptacle, and
(ii) an upper portion,
(iii) an external shape and appearance simulating a conventional cylindrically shaped vehicle cigarette lighter of the type normally seated in said receptacle;
(b) a light transmitting lens mounted in said upper portion;
(c) indicia formed on said lens such that said indicia is visible to a passenger in the vehicle when said lower portion is seated in said receptacle;
(d) a light source mounted inside said body, said light source when activated generating light which passes through said lens and outwardly from said body to illuminate said lens and said indicia;
(e) a control circuit mounted inside said body and connected to said light source to activate said light source to generate light which passes through said lens.

* * * * *